(12) United States Patent
Barfurth et al.

(10) Patent No.: US 7,625,975 B2
(45) Date of Patent: Dec. 1, 2009

(54) COMPOSITION ACTING AS COUPLING AGENT FOR FILLED AND PEROXIDICALLY CROSSLINKING RUBBER COMPOUNDS

(75) Inventors: Dieter Barfurth, Rheinfelden (DE); Helmut Mack, Rheinfelden (DE); Burkhard Standke, Lörrach (DE)

(73) Assignee: Degussa AG, Duesseldorf (DE)

( * ) Notice: Subject to any disclaimer, the term of this patent is extended or adjusted under 35 U.S.C. 154(b) by 562 days.

(21) Appl. No.: 10/524,689

(22) PCT Filed: Jun. 20, 2003

(86) PCT No.: PCT/EP03/06543

§ 371 (c)(1), (2), (4) Date: Jan. 12, 2006

(87) PCT Pub. No.: WO2004/018546

PCT Pub. Date: Mar. 4, 2004

(65) Prior Publication Data
US 2007/0032609 A1 Feb. 8, 2007

(30) Foreign Application Priority Data
Aug. 22, 2002 (DE) ............ 102 38 369

(51) Int. Cl.
*C08L 9/00* (2006.01)
(52) U.S. Cl. ........... 524/571; 524/425; 524/430; 524/437; 524/447; 524/449; 524/565; 428/403; 428/405; 525/477
(58) Field of Classification Search ............ None
See application file for complete search history.

(56) References Cited

U.S. PATENT DOCUMENTS

| | | | |
|---|---|---|---|
| 4,172,189 A | 10/1979 | Muller et al. | |
| 4,528,081 A * | 7/1985 | Lien et al. ............ | 522/39 |
| 6,133,466 A | 10/2000 | Edelmann et al. | |
| 6,239,194 B1 | 5/2001 | Standke et al. | |
| 6,251,989 B1 | 6/2001 | Edelmann et al. | |
| 6,255,513 B1 | 7/2001 | Standke et al. | |
| 6,312,553 B1 * | 11/2001 | Okinoshima et al. ....... | 156/329 |
| 6,337,361 B1 * | 1/2002 | Yatsuyanagi et al. ....... | 523/209 |
| 6,361,871 B1 | 3/2002 | Jenkner et al. | |
| 6,395,856 B1 | 5/2002 | Petty et al. | |
| 6,395,858 B1 | 5/2002 | Mack et al. | |
| 6,403,228 B1 | 6/2002 | Mack et al. | |
| 6,444,315 B1 | 9/2002 | Barfurth et al. | |
| 6,500,883 B1 | 12/2002 | Mack et al. | |
| 6,528,585 B1 | 3/2003 | Standke et al. | |
| 6,534,667 B1 | 3/2003 | Standke et al. | |
| 6,770,327 B2 | 8/2004 | Edelmann et al. | |
| 6,780,955 B2 | 8/2004 | Barfurth et al. | |
| 6,784,272 B2 | 8/2004 | Mack et al. | |
| 6,841,197 B2 | 1/2005 | Standke et al. | |
| 2002/0127415 A1 | 9/2002 | Standke et al. | |
| 2003/0134969 A1 | 7/2003 | Schlosser et al. | |
| 2004/0054048 A1 | 3/2004 | Barfurth et al. | |
| 2004/0209972 A1 * | 10/2004 | Chambers et al. ............ | 522/99 |

FOREIGN PATENT DOCUMENTS

| | | |
|---|---|---|
| EP | 0 518 057 | 12/1992 |
| EP | 0 814 110 | 12/1997 |
| EP | 0 978 525 | 2/2000 |
| EP | 1 205 505 | 5/2002 |
| JP | 10-273559 | * 10/1998 |

OTHER PUBLICATIONS

U.S. Appl. No. 10/566,371, filed Jan. 30, 2006, Barfurth, et al.
U.S. Appl. No. 10/555,984, filed Nov. 8, 2005, Barfurth, et al.

* cited by examiner

*Primary Examiner*—Marc S Zimmer
(74) *Attorney, Agent, or Firm*—Oblon, Spivak, McClelland, Maier & Neustadt, L.L.P.

(57) ABSTRACT

The present invention relates to a composition acting as coupling agent between fillers and peroxidically crosslinking elastomers in rubber compounds, which comprises, as component comprising silicon compounds, a mixture a) of vinylalkoxysiloxanes with alkylalkoxy-siloxanes, or b) of vinylalkoxysiloxanes with phenylalkoxy-siloxanes, or c) of vinylalkoxysiloxanes with phenyl/alkyl-alkoxysiloxanes or d) of acrylic or methacrylic alkoxysiloxanes with alkylalkoxysiloxanes, or e) of acrylic or methacrylic alkoxysiloxanes with phenylalkoxysiloxanes, or f) of acrylic or methacrylic alkoxysiloxanes with phenyl/alkylalkoxysiloxanes, or g) of at least one co-oligomeric organosiloxane which, as organofunctional groups, bears at least one group from the series vinyl, acrylic and methacrylic, and at least one group from the series alkyl and phenyl, and at least one alkoxy or hydroxy group. The present invention further relates to the use of a composition of the invention as a coupling agent in filled and peroxidically crosslinking rubber compounds, to rubber compounds obtained in this way, and to items made therefrom.

18 Claims, No Drawings
COMPOSITION ACTING AS COUPLING AGENT FOR FILLED AND PEROXIDICALLY CROSSLINKING RUBBER COMPOUNDS

CROSS REFERENCES TO RELATED APPLICATIONS

This application is a national stage application of International Patent Application No. PCT/EP03/06543, filed on Jun. 20, 2003, and claims priority to German Patent Application No. 102 38 369.3, filed Aug. 22, 2002, both of which are incorporated herein by reference in their entireties.

The present invention relates to a composition which comprises silicon compounds and acts as a coupling agent between fillers and peroxidically crosslinking elastomers in rubber compounds, and to its use.

The use of vinylsilanes, in particular vinyltrimethoxyethoxysilane (DYNASYLAN® VTMOEO), and vinyltriethoxysilane (DYNASYLAN® VTEO) as coupling agent in peroxidically crosslinking ethylene-propylene rubber (EPR), ethylene-propylene-diene rubber (EPDM), or in other rubber compounds, such as styrene-butadiene rubber (SBR), natural rubber (NR), acrylate copolymer rubber (ACM), acrylonitrile-butadiene rubber (NBR), or polybutadiene rubber (BR) is known. These are usually filled rubber compounds. Examples of fillers used are kaolin, where appropriate in calcined form, or other silicatic fillers, such as silica, quartz, cristobalite, talc, montmorillonite, wollastonite, or mica, or $CaCO_3$, aluminum hydroxide (ATH), magnesium hydroxide (MDH), or titanium dioxide, or else organic fillers, such as cellulose, flax, and sisal. The vinylsilane here binds the filler to the rubber.

It is also known that physical mixtures of monomeric unsaturated silanes, such as vinyltriethoxysilane (DYNASYLAN® VTEO) or 3-methacryloxypropyltrimethyoxysilane (DYNASYLAN® MEMO) with oligomeric alkylsilanes permit improved dispersion of the filler in the rubber matrix (EP 0 124 805 A). A disadvantage of monomeric silanes is their volatility. The boiling point of VTEO is 158° C. Another disadvantage of monomeric silanes is that for each mole of trialkoxysilane an equimolar amount of hydrolysis alcohol is liberated.

An object on which the present invention was based was to mitigate the disadvantages mentioned.

Surprisingly, it has been found that a mixture of oligomeric vinylsilanes, i.e. vinyl-functional siloxanes, such as DYNASYLAN® 6498, and of oligomeric alkylsilanes, i.e. alkyl-functional siloxanes, such as DYNASYLAN® 9892, has excellent suitability as a coupling agent for peroxidically crosslinking, filled rubber compounds. The volatility of mixtures of the invention is considerably less than that of monomeric unsaturated silanes, and also than that of mixtures of monomeric unsaturated silane and oligomeric alkylsilanes. This also leads to increased product safety during usage. The use of the vinylalkoxysiloxane-containing mixtures of the invention can moreover reduce significantly the amount of volatile organic compounds (VOCs), in particular alcohol, produced on application, while coupling-agent properties are generally at least comparably good.

The invention achieves the object set as set out in the patent claims.

The present invention therefore provides a composition acting as coupling agent between fillers and peroxidically crosslinking elastomers in rubber compounds, which comprises, as component comprising silicon compounds, a mixture a) of vinylalkoxysiloxanes with alkylalkoxysiloxanes, or
b) of vinylalkoxysiloxanes with phenylalkoxysiloxanes, or
c) of vinylalkoxysiloxanes with phenyl/alkylalkoxysiloxanes, or
d) of acrylic or methacrylic alkoxysiloxanes with alkylalkoxysiloxanes, or
e) of acrylic or methacrylic alkoxysiloxanes with phenylalkoxysiloxanes, or
f) of acrylic or methacrylic alkoxysiloxanes with phenyl/alkylalkoxysiloxanes, or
g) of at least one co-oligomeric organosiloxane which, as organofunctional groups, bears at least one group from the series vinyl, acrylic and methacrylic, and at least one group from the series alkyl and phenyl, and at least one alkoxy or hydroxy group.

An example of a method of preparing said vinyl-, alkyl-, phenyl-, acrylic, methacrylic, or organoalkoxysiloxanes can use the teaching of the following documents: EP 0 101 541 A, EP 0 518 057 A, EP 0 814 110 A, EP 0 978 525 A and EP 1 205 505 A. The protected rights mentioned here are incorporated into the disclosure content of the present application by way of reference.

The composition of the invention may generally be prepared by mixing the respective components to be used, or stirring these together. Operations here should be carried out with exclusion of water. The siloxanes used here are therefore substantially alkoxysiloxanes. However, it is also possible for any of the alkoxy groups to be converted by hydrolysis into a hydroxy group.

The composition of the invention may also comprise, besides the siloxane components, other components which are non-silicon-containing, such as plasticizers, and/or processing aids.

The composition of the invention preferably comprises from 0.1 to 100% by weight, with preference from 20 to 80% by weight, particularly preferably from 40 to 60% by weight, of a vinyl-, acrylic-, and/or methacrylic-functional alkoxysiloxane, based on all of the components present in the composition. The composition of the invention also appropriately comprises from 0 to 80% by weight, preferably from 0.1 to 70% by weight, particularly preferably from 20 to 60% by weight, in particular from 40 to 50% by weight, of an alkyl- and/or phenyl-functional alkoxysiloxane, based on all of the components present in the composition. It should be emphasized that no monomeric silanes are present in the composition of the invention.

The composition of the invention preferably comprises at least one chain-type or cyclic vinylalkoxysiloxane of the general formula (Ia) or (Ib)

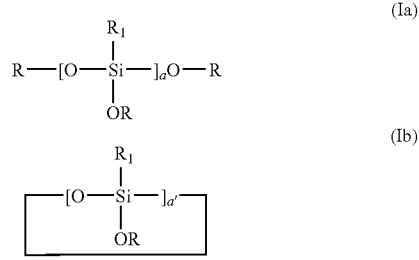

where the groups R are identical or different and R is methyl, ethyl, n-propyl, isopropyl, 2-methoxyethyl, or hydrogen, $R^1$ is a vinyl group, each of a and a', independently, is an integer from 2 to 50, preferably from 3 to 15, where the siloxanes may be present in the form of linear, branched, or cyclic moieties.

Preferred chain-type or cyclic alkylalkoxysiloxanes of the composition of the invention may be described by the general formulae (IIa) and (IIb)

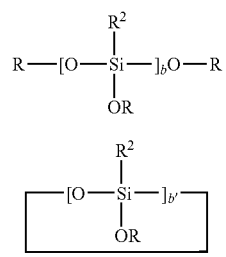

(IIa)

(IIb)

where the groups R are identical or different and R is methyl, ethyl, n-propyl, isopropyl, 2-methoxyethyl, or hydrogen, the groups $R^2$ are identical or different, and each $R^2$ is a linear, branched, or cyclic alkyl group having from 1 to 18 carbon atoms, each of b and b', independently, is an integer from 2 to 50, preferably from 3 to 15, where the siloxanes may be present in the form of linear, branched, or cyclic moieties.

Examples which should be mentioned are: methylmethoxysiloxane, also termed methylmethoxysilane oligomer, and correspondingly propylmethoxysilane oligomer, isobutylmethoxysilane oligomer, octylmethoxysilane oligomer, methylethoxysilane oligomer, propylethoxysilane oligomer, isobutylethoxysilane oligomer, octylethoxysilane oligomer, methylmethoxysilane cyclooligomer, propylmethoxysilane cyclooligomer, to mention just a few examples.

Chain-type or cyclic phenylalkoxysiloxanes which are also preferred may be described by the general formulae (IIIa) and (IIIb)

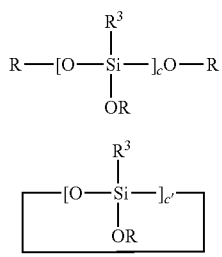

(IIIa)

(IIIb)

where the groups R are identical or different and R is methyl, ethyl, n-propyl, isopropyl, 2-methoxyethyl, or hydrogen, $R^3$ is a phenyl group, each of c and c', independently, is an integer from 2 to 50, preferably from 3 to 15, where the siloxanes may be present in the form of linear, branched, or cyclic moieties.

Examples which should be mentioned here are: phenylmethoxysilane oligomer, phenylethoxysilane oligomer, phenylmethoxysilane cyclooligomer, phenylethoxysilane cyclooligomer.

Chain-type or cyclic alkylphenylalkoxysilanes which are also preferred may be described by the general formulae (IVa) and (IVb)

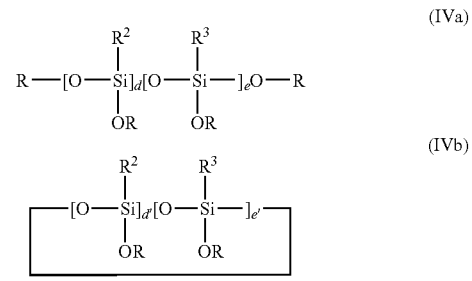

(IVa)

(IVb)

where the groups R are identical or different and R is methyl, ethyl, n-propyl, isopropyl, 2-methoxyethyl, or hydrogen, the groups $R^2$ are identical or different, each $R^2$ being a linear, branched, or cyclic alkyl group having from 1 to 18 carbon atoms, for example n-propyl, n-butyl, isobutyl, tert-butyl, n-octyl, isooctyl, or hexadecyl, $R^3$ is a phenyl group, each of d, d', e and e', independently, is an integer from 1 to 35 and complies with the provisos that $1<(d+e)<50$ and $1<(d'+e')<50$, preferably $2<(d+e)<30$ and $2<(d'+e')<30$, particularly preferably $3<(d+e)<10$ and $3<(d'+e')<10$, where the siloxanes may be present in the form of linear, branched, or cyclic moieties.

Examples which should be mentioned are: methylphenylmethoxysilane oligomer, propylphenylmethoxysilane oligomer, isobutylphenylmethoxysilane oligomer, octylphenylmethoxysilane oligomer, methylphenylethoxysilane oligomer, propylphenylethoxysilane oligomer, isobutylphenylethoxysilane oligomer, octylphenylethoxysilane oligomer, methylphenylmethoxysilane cyclooligomer, propylphenylmethoxysilane cyclooligomer, to mention just a few examples.

Also preferred is the use in the composition of the invention of at least one chain-type or cyclic acrylic- or methacrylic-functional alkoxysiloxane of the general formula (Va) or (Vb)

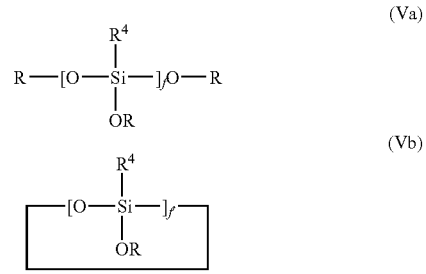

(Va)

(Vb)

where the groups R are identical or different and R is methyl, ethyl, n-propyl, isopropyl, 2-methoxyethyl, or hydrogen, the groups $R^4$ are identical or different, and $R^4$ is an acrylic or methacrylic group, each of f and f', independently, is an integer from 2 to 50, preferably from 3 to 15, where the siloxanes may be present in the form of linear, branched, or cyclic moieties.

Examples which may be mentioned here are: acryloxypropylmethoxysilane oligomer, methacryloxypropylmethoxysilane oligomer, acryloxypropylethoxysilane oligomer, methacryloxypropylethoxysilane oligomer, acryloxypropylmethoxysilane cyclooligomer, methacryloxypropylmethoxysilane cyclooligomer, acryloxypropylethoxysilane cyclooligomer, methacryloxypropylethoxysilane cyclooligomer.

However, the functionalities hitherto mentioned may also be present in the composition of the invention in a preferred chain-type or cyclic organoalkoxysiloxane of the general formula (VIa) or (VIb)

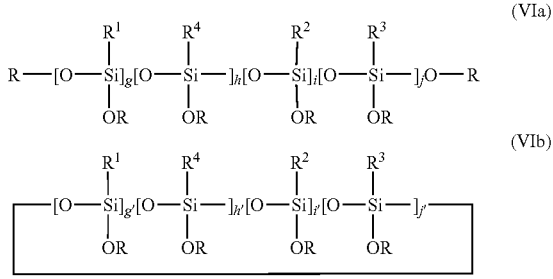

where the groups R, R$^1$, R$^2$, R$^3$ and R$^4$ are as defined above, each of g, g', h, h', i, i', j, and j' is, independently, an integer from 0 to 35 and complies with the provisos g≧1 and/or h≧1, and 1<(g+h+i+j)<50, and g'≧2 and/or h'≧1, and 1<(g'+h'+i'+j')<50, preferably 2<(g+h+i+j)<30 and 2<(g'+h'+i'+j')<30, particularly preferably 3<(g+h+i+j)<10 and 3<(g'+h'+i'+j')<10, where these siloxanes may be present in the form of linear, branched, or cyclic moieties.

Examples which should be mentioned are: methylacryloxypropylmethoxysiloxane or methylacryloxypropylmethoxysilane oligomer, and correspondingly methylacryloxypropylmethoxysilane cyclooligomer, propylmethacryloxypropylmethoxysiloxane, propylacryloxypropylethoxysilane oligomer, octylmethacryloxypropylethoxysiloxane, to mention must a few examples.

A preferred example of a formula of branched moieties which are mentioned above is:

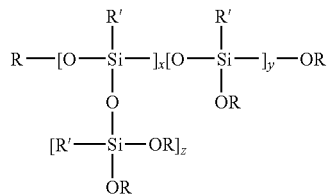

where the groups R and R'=R$^1$, R$^2$, R$^3$, R$^4$, independently, are as defined above, x, y and z, independently, are integers from 1 to 35 and have the meaning of above a, b, c, d, e, f, g, h, i and/or j and (x+y+z)=a or (x+y+z)=b or (x+y +z)=c or (x+y+z)=(d+e) or (x+y+z)=f or (x+y+z)=(g+h+i+j).

If the composition of the invention is added to a mixture of elastomer and filler, reactions take place firstly under processing conditions, e.g. in the case of an EPDM rubber mixed with kaolin and processed at about 140° C., between the alkoxy or hydroxy groups of the siloxane components and appropriate hydrophilic groups of the filler, in particular a hydroxy group, and secondly under crosslinking conditions, e.g. using a peroxide at about 180° C. within a period of about a quarter of an hour, between the unsaturated ethylenic group and the elastomer. The result is that the filler becomes advantageously bound into the rubber compound or appropriately obtainable items, since, inter alia, no losses of coupling agent occur.

The composition of the invention may also be advantageously applied on a carrier in the form of a "dry liquid". Carrier materials suitable for this purpose are preferably porous polymers, e.g. polyethylene with pore volume >50%, carbon black, waxes, e.g. LDPE-based polyolefin waxes, silicas (fumed, precipitated, naturally occurring), calcium silicates.

A composition of the invention may thus be used advantageously as a coupling agent in filled and peroxidically crosslinking rubber compounds.

The invention also provides filled and peroxidically crosslinking rubber compounds which comprise a composition of the invention.

The manner of preparing rubber compounds of the invention is generally that, for example, an EPDM rubber is mixed in an internal mixer, e.g. Werner & Pfleiderer BANBURY type, with kaolin, and where appropriate with another filler, and also, where appropriate, with a vulcanization activator and a hydrocarbon-based plasticizer, at from about 100 to 140° C. This intermediate product may then be mixed on a roll mill with peroxide and accelerator and may be vulcanized, i.e. crosslinked, by heating to about 180° C. to give the rubber composition. The vulcanizate may be processed using suitable machinery, e.g. using specific roll mills (calenders), inter alia to give sheet-like strips of rubber from which products such as gaskets are produced in downstream processes.

Rubber compounds of the invention preferably have a content of elastomer from the series ethylene-propylene rubber (EPR), ethylene-propylene-diene rubber (EPDM), styrene-butadiene rubber (SBR), natural rubber (NR), acrylate copolymer rubber (ACM), acrylonitrile-butadiene rubber (NBR), and/or polybutadiene rubber (BR).

Rubber compounds of the invention also have a content of filler from the series silicatic or organic fillers, such as kaolin, silica, quartz, cristobalite, talc, montmorillonite, wollastonite, mica, calcium carbonate, chalk, dolomite, aluminum hydroxide, magnesium hydroxide, titanium dioxide, cellulose, flax, and sisal.

This is therefore an advantageous method—advantageous since the proportion of volatile silanes has been reduced practically to zero and moreover the proportion of volatile alcohols (VOCs) has also been reduced to less than 50% of the amount of silane used—of producing the following items, for example, from rubber compounds: cable sheathing, gaskets, moldings for damping purposes, hoses and profiles, shaped items, rubber-metal composites, conveyor belts, flat or V-shaped drive belts, foam products, sponge products, cellular rubber product, shoe-sole material, and sheet products, to mention just a few examples.

The present invention therefore also provides items which are obtained by processing rubber compounds of the invention.

The examples below give further description of the present invention:

EXAMPLES

1. General Description of Experimental Method:

The EPDM rubber (BUNA® EP 3473) is mixed in a BANBURY internal mixer with calcined kaolin (POLESTAR® 200 R), and with a second filler (chalk: Mikrosöhl 20), and with a vulcanization activator (RS zinc oxide), and with a hydrocarbon-based plasticizer (Tudalen B-8013), and also with the vinylsilane or with an appropriate Si-containing composition (variable amounts), at from about 100 to 140° C.

The resultant intermediate product is mixed on a roll mill with antioxidant (a mixture of Vulkanox HS and Vulkanox MB), and with the accelerator (triallylcyanurate), and finally with the peroxide (Perkadox 14/40). The rubber composition is then vulcanized (crosslinked) by heating to about 180° C. within a period of from 8 to 10 min.

Sheets are compression molded from the vulcanizate, and from these the test specimens are produced for the mechanical and electrical tests.

2. Description of Silicon Compounds Used

2.1 Chemical Structure

| | |
|---|---|
| DYNASYLAN ® VTMO | $CH_2=CH-Si(O-CH_3)_3$; vinyltrimethoxysilane |
| DYNASYLAN ® VTEO | $CH_2=CH-Si(O-C_2H_5)_3$; vinyltriethoxysilane |
| DYNASYLAN ® VTMOEO | $CH_2=CH-Si(O-C_2H_4-O-CH_3)_3$; vinyltris(2-methoxyethoxy)silane |
| DYNASYLAN ® 6498 | Oligomeric vinyltriethoxysilane: $[CH_2=CH-Si(O-C_2H_5)-O-]_n$ where n = 3-10 |
| DYNASYLAN ® 9892 | Oligomeric propyltriethoxysilane: $[C_3H_7-Si(O-C_2H_5)-O-]_n$ where n = 3-10 |
| Comparative product: RC-1 | Mixture of vinyltriethoxysilane and an oligomeric methyltriethoxysilane |

When the inventive mixture of DYNASYLAN® 6498 with DYNASYLAN® 9862 is used, the amount of volatile constituents (VOCs) reduces by 42% when comparison is made with DYNASYLAN® VTMOEO, by 36% when comparison is made with DYNASYLAN® VTEO, and by 27% when comparison is made with the comparative product RC-1. When compared with DYNASYLAN® VTMOEO, the inventive mixture has a similar boiling point and flashpoint, without at the same time having the disadvantage of the high content of volatile and physiologically hazardous 2-methoxyethanol.

2.2 Product Data

| DYNASYLAN ® (abbreviation: DS) | VTMO | VTEO | VTMOEO | RC-1 | Mixture of the invention: 48% DS 6498 + 52% DS 9892 |
|---|---|---|---|---|---|
| Flashpoint [° C.] | 22 | 38 | 115 | 38 | >120 |
| Boiling point [° C.] | 123 | 158 | 108 [3 h Pa] | about 160 | >240 |
| $SiO_2$ content [% by weight] | 40.5 | 31.6 | 21.4 | 39.7 | 43.3 |
| Vinyl content [% by weight] | 18.2 | 14.2 | 9.6 | 9.6 | 9.9 |
| Alcohol eliminated [g/kg] | 650 | 730 | 815 | 640 | 470 |
| Alcohol eliminated [nature] | methanol | ethanol | 2-methoxyethanol | ethanol | ethanol |

3. Composition of Mixes

| Components amounts given in parts by weight | Comparative example 1 | Comparative example 2 | Comparative example 3 | Inventive example |
|---|---|---|---|---|
| BUNA ® EP 3473 (EPDM rubber) | 130 | 130 | 130 | 130 |
| POLESTAR ® 200 R (calcined kaolin) | 140 | 140 | 140 | 140 |
| Mikrosöhl 20 (chalk) | 80 | 80 | 80 | 80 |
| RS zinc oxide (activator) | 10 | 10 | 10 | 10 |
| Tudalen B-8013 (plasticizer) | 15 | 15 | 15 | 15 |
| Silane [nature], see table 2.2 product data | VTMOEO | VTEO | RC-A | DS6498 + DS9892 mixture (48/52) |
| Silane (parts by weight) | 1.4 | 1.0 | 1.4 | 1.4 |
| Vulkanox HS (antioxidant) | 1.2 | 1.2 | 1.2 | 1.2 |
| Vulkanox MB (antioxidant) | 0.5 | 0.5 | 0.5 | 0.5 |
| Triallyl cyanurate (accelerator) | 1.0 | 1.0 | 1.0 | 1.0 |
| Perkadox 14/40 (peroxide crosslinker) | 7.5 | 7.5 | 7.5 | 7.5 |

4. Processing Conditions (Rheological Data)

| Test results | Comparative example 1 | Comparative example 2 | Comparative example 3 | Inventive example |
|---|---|---|---|---|
| t10 (10% vulcanization) [min] | 1.33 | 1.43 | 1.48 | 1.50 |
| t90 (90% vulcanization) [min] | 6.87 | 6.90 | 7.18 | 7.13 |
| Mooney viscosity [dNm] 0% vulcanization | 9.6 | 10.1 | 10.0 | 9.7 |
| Mooney viscosity [dNm] 100% vulcanization | 54.9 | 55.3 | 54.0 | 54.2 |

The inventive additive can be processed in the same way as the comparative products in the rubber mixture. The usual extent of vulcanization occurs.

5. Mechanical Data After Vulcanization (15 min/180° C.)

| Test results | Comparative example 1 | Comparative example 2 | Comparative example 3 | Inventive example |
|---|---|---|---|---|
| Tensile strength [MPa] | 8.7 | 8.2 | 8.2 | 8.5 |
| 100% modulus [MPa] | 5.0 | 5.0 | 4.9 | 5.0 |
| 200% modulus [MPa] | 8.0 | 7.9 | 7.8 | 8.2 |
| Elongation at break [%] | 254 | 228 | 245 | 243 |
| Residual elongation [%] | 8 | 5 | 7 | 7 |
| Shore A hardness at 23° C. | 70 | 72 | 72 | 72 |

The mechanical values which can be obtained from the rubber component produced using the mixture of the invention are equivalent or better than those of the comparative products.

6. Mechanical Data After Aging (7 Days At 135° C.)

| Test results | Comparative example 1 | Comparative example 2 | Comparative example 3 | Inventive example |
|---|---|---|---|---|
| Tensile strength [MPa] | 10.3 | 9.7 | 9.5 | 10.6 |
| 100% modulus [MPa] | 6.1 | 6.0 | 6.0 | 6.0 |
| 200% modulus [MPa] | 10.1 | 9.6 | — | 10.2 |
| Elongation at break [%] | 210 | 206 | 198 | 227 |
| Shore A hardness at 23° C. | 72 | 73 | 73 | 73 |

After the rubber components produced using the inventive mixture have been subjected to thermal aging, some of the mechanical values are better than those of the comparative products. For example, elongation at break is up to 14% higher.

7. Electrical Data

| Test results | Comparative example 1 | Comparative example 2 | Comparative example 3 | Inventive example |
|---|---|---|---|---|
| Volume resistivity $\rho_D$ [$10^{14}\ \Omega \cdot cm$] after 16 h at standard conditions of temperature and humidity | 4.88 | 4.89 | 4.98 | 5.87 |
| Volume resistivity $\rho_D$ [$10^{14}\ \Omega \cdot cm$] after 2 h of storage in water (90° C.) | 1.17 | 2.19 | 7.32 | 7.01 |
| Volume resistivity $\rho_D$ [$10^{14}\ \Omega \cdot cm$] after 100 h of storage in water (90° C.) | 0.45 | 0.72 | 7.28 | 9.40 |
| Dielectric constant $\epsilon_r$ after 16 h at standard conditions of temperature and humidity | 3.3 | 3.4 | 3.4 | 3.4 |
| Dielectric constant $\epsilon_r$ after 2 h of storage in water (90° C.) | 4.9 | 4.9 | 4.5 | 4.3 |
| Dielectric constant $\epsilon_r$ after 100 h of storage in water (90° C.) | 6.3 | 6.2 | 4.9 | 4.7 |
| Tan δ [$10^{-3}$] after 16 h at standard conditions of temperature and humidity | 18.6 | 26.4 | 21.5 | 15.7 |
| Tan δ [$10^{-3}$] after 2 h of storage in water (90° C.) | 70.2 | 59.8 | 36.5 | 31.1 |
| Tan δ [$10^{-3}$] after 100 h of storage in water (90° C.) | 94.2 | 77.8 | 33.7 | 28.7 |

The superiority of the inventive mixture is apparent from the electrical data, particularly after storage in water. Unlike comparisons 1 and 2, in which the insulating action breaks down (fall-off in volume resistivity, rise in dielectric coefficient and in tan δ), even after 100 hours at 90° C. insulation is retained or even improved, e.g. by virtue of the rise in volume resistivity.

What is claimed is:

1. A composition comprising a mixture of:
   a) a vinylalkoxysiloxane and an alkylalkoxysiloxane, or
   b) a vinylalkoxysiloxane and a phenylalkoxysiloxane, or
   c) a vinylalkoxysiloxane and a phenyl/alkylalkoxysiloxane, or
   d) an acrylic or methacrylic alkoxysiloxane and alkylalkoxysiloxane, or
   e) an acrylic or methacrylic alkoxysiloxane and phenylalkoxysiloxane, or
   f) an acrylic or methacrylic alkoxysiloxane and phenyl/alkylalkoxysiloxane.

2. The composition as claimed in claim 1, further comprising a plasticizer, a processing aid, or mixtures thereof.

3. The composition as claimed in claim 1, which comprises from 0.1 to 80% by weight of a vinyl-, acrylic-, or methacrylic-functional alkoxysiloxane, based on all of the components present in the composition.

4. The composition as claimed in claim 1, which comprises from 0.1 to 80% by weight of the alkyl- or phenyl-functional alkoxysiloxane, based on all of the components present in the composition.

5. The composition as claimed in claim 1, which comprises at least one vinylalkoxysiloxane of the formula (Ia) or (Ib)

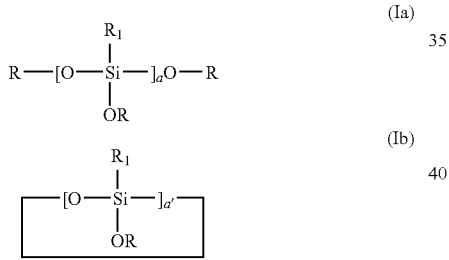

wherein R are identical or different and R is methyl, ethyl, n-propyl, isopropyl, 2-methoxyethyl, or hydrogen, $R^1$ is a vinyl group, each of a and a', independently, is an integer from 2 to 50, where the siloxanes may be present in the form of linear, branched, or cyclic moieties.

6. The composition as claimed in claim 1, which comprises at least one alkylalkoxysiloxane of the formula (IIa) or (IIb)

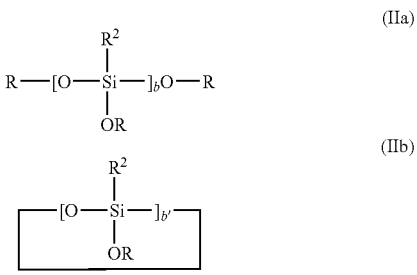

wherein R are identical or different and R is methyl, ethyl, n-propyl, isopropyl, 2-methoxyethyl, or hydrogen, $R^2$ are identical or different, and each $R^2$ is a linear, branched, or cyclic alkyl group having from 1 to 18 carbon atoms, each of b and b', independently, is an integer from 2 to 50, where the siloxanes may be present in the form of linear, branched, or cyclic moieties.

7. The composition as claimed in claim 1, which comprises at least one phenylalkoxysiloxane of the formula (IIIa) or (IIIb)

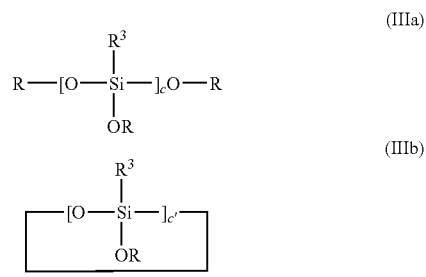

wherein R are identical or different and R is methyl, ethyl, n-propyl, isopropyl, 2-methoxyethyl, or hydrogen, $R^3$ is a phenyl group, each of c and c', independently, is an integer from 2 to 50, where the siloxanes may be present in the form of linear, branched, or cyclic moieties.

8. The composition as claimed in claim 1, which comprises at least one alkylphenylalkoxysiloxane of the formula (IVa) or (IVb)

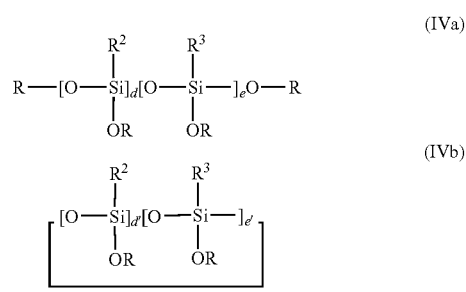

wherein R are identical or different and R is methyl, ethyl, n-propyl, isopropyl, 2-methoxyethyl, or hydrogen, $R^2$ are identical or different, each $R^2$ being a linear, branched, or cyclic alkyl group having from 1 to 18 carbon atoms, $R^3$ is a phenyl group, each of d, d', e and e', independently, is an integer from 1 to 35 and wherein 1<(d+e)<50 and 1<(d'+e')<50, where the siloxanes may be present in the form of linear, branched, or cyclic moieties.

9. The composition as claimed in claim 1, which comprises at least one acrylic or methacrylic alkoxysiloxane of the formula (Va) or (Vb)

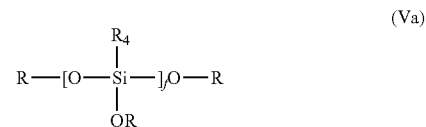

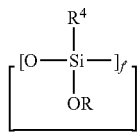

(Vb)

wherein R are identical or different and R is methyl, ethyl, n-propyl, isopropyl, 2-methoxyethyl, or hydrogen, $R^4$ are identical or different, and $R^4$ is an acrylic or methacrylic group, each of f and f', independently, is an integer from 2 to 50, where the siloxanes may be present in the form of linear, branched, or cyclic moieties.

10. The composition as claimed in claim 1, which has been applied to a carrier.

11. The composition as claimed in claim 10, wherein said carrier is selected from the group consisting of a porous polymer, carbon black, wax, silica, and calcium silicate.

12. A method of coupling a filler with a peroxidically crosslinking rubber compound, said method comprising incorporating said composition as claimed in claim 1 and said filler in said rubber compound.

13. A filled and peroxidically crosslinking rubber compound which comprises said composition as claimed in claim 1.

14. The rubber compound as claimed in claim 13, which comprises ethylene-propylene rubber, ethylene-propylene-diene rubber, styrene-butadiene rubber, natural rubber, acrylate copolymer rubber, acrylonitrile-butadiene rubber, polybutadiene rubber, or mixtures thereof.

15. The rubber compound as claimed in claim 13, which comprises a silicatic filler or an organic filler.

16. The rubber compound as claimed in claim 15, which comprises kaolin, silica, quartz, crystobalite, talc, montmorillonite, wollastonite, mica, calcium carbonate, chalk, dolomite, aluminum hydroxide, magnesium hydroxide, titanium dioxide, cellulose, flax, sisal, or mixtures thereof.

17. An article comprising said rubber compound as claimed in claim 12.

18. A rubber compound produced by incorporating said composition as claimed in claim 1 with a filler and a peroxidically crosslinking rubber compound.

* * * * *